United States Patent [19]

Clark et al.

[11] Patent Number: 5,054,965
[45] Date of Patent: Oct. 8, 1991

[54] DIVERTER APPARATUS FOR PNEUMATIC CONVEYING SYSTEM

[75] Inventors: Douglas S. Clark, Sabetha; Elmer Osterhaus, Seneca, both of Kans.

[73] Assignee: Wenger Manufacturing, Inc., Sabetha, Kans.

[21] Appl. No.: 580,316

[22] Filed: Sep. 10, 1990

[51] Int. Cl.⁵ .................. B65G 53/24; B65G 53/34; B65G 53/52
[52] U.S. Cl. .................................. 406/151; 406/152; 406/192
[58] Field of Search ............... 406/151, 117, 183, 192, 406/113, 152

[56] References Cited

U.S. PATENT DOCUMENTS

| | | | |
|---|---|---|---|
| 1,184,151 | 5/1916 | Tulley | 406/152 |
| 1,816,223 | 7/1931 | Jackson | 406/192 X |
| 4,547,099 | 10/1985 | Alexandrer et al. | 406/192 X |

*Primary Examiner*—Margaret A. Focarino
*Assistant Examiner*—James M. Kannofsky
*Attorney, Agent, or Firm*—Hovey, Williams, Timmons & Collins

[57] ABSTRACT

An improved diverter apparatus (18) is provided for use in pneumatic conveying systems (16), in order to permit selective diversion of product to waste or recycle. The apparatus (18) includes an elongate tubular body (42) having at least one opening (48) therein; a gate (52) is situated adjacent the opening (48) for normally closing the same. A piston and cylinder assembly (62) is operatively coupled with the gate (52) for selective, remote operation of the gate (52). When the gate (52) is opened, product is diverted and does not pass the gate (52).

3 Claims, 2 Drawing Sheets

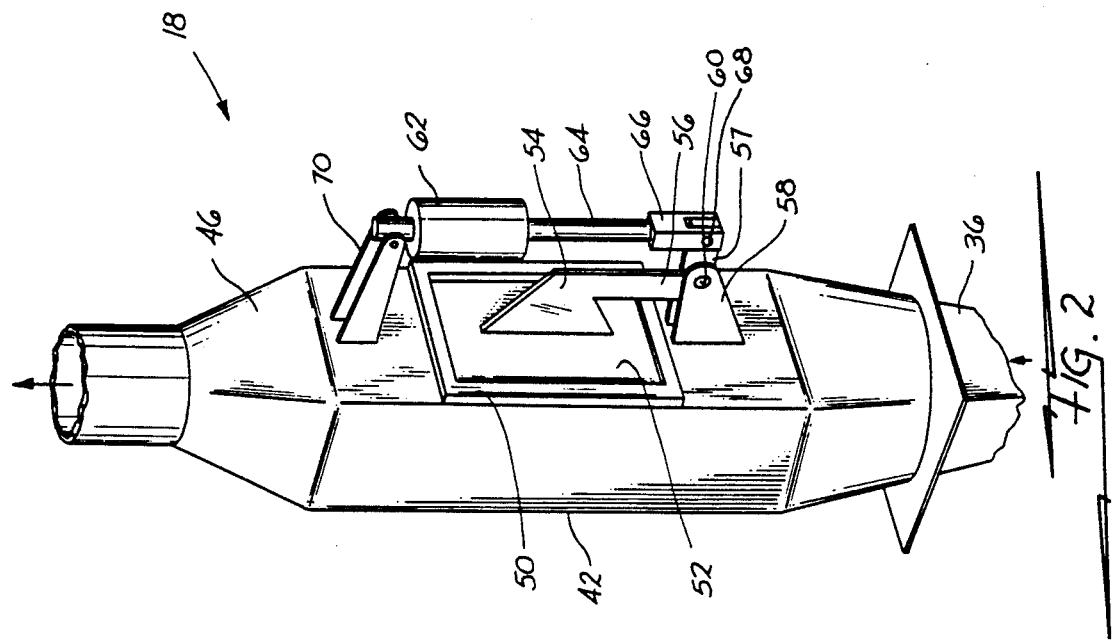
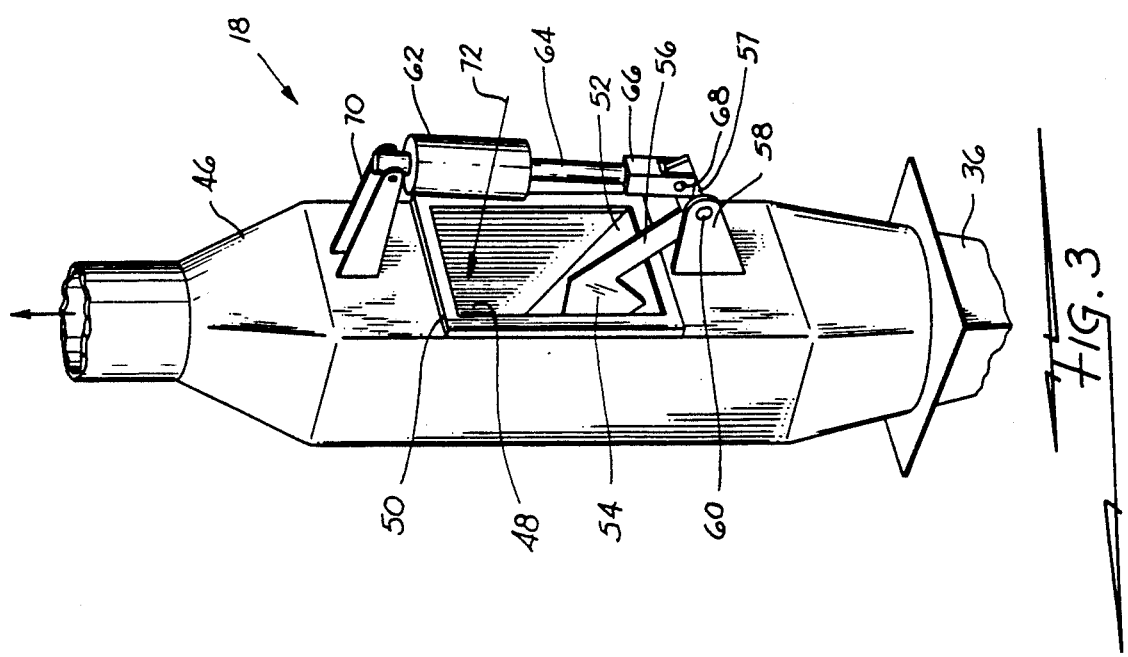

DIVERTER APPARATUS FOR PNEUMATIC CONVEYING SYSTEM

BACKGROUND OF THE INVENTION

1. Field of the Invention

The present invention is broadly concerned with a diverter apparatus designed for use in pneumatic conveying systems of the type typically employed as an adjunct to an extrusion processing system. More particularly, it is concerned with such diverter apparatus which makes use of only shiftable gate for the diversion of product, which can be easily controlled from remote location so as to facilitate extruder operation.

2. Description of the Prior Art

Pneumatic conveying systems are in widespread use in many industries for the transfer of discrete product pieces from one location to the next. For example, in extrusion processing of human and pet foods, a pneumatic conduit assembly may be conventionally employed for transfer of hot, moist extrudate from the extruder outlet to downstream processing stations such as a dryer, for example. Generally speaking, such pneumatic assemblies employ an elongated tubular conduit adapted to receive extrudate together with an upstream negative pressure fan. The fan in turn induces product-conveying air streams through the conduit for downstream transfer of the product.

Systems of this type also generally require some means for diverting the product flow. To give one example, during extruder startup the product is generally unsatisfactory until extruder conditions have stabilized, a process that may take up to an hour. It would be manifestly unwise to fully process such unsatisfactory product, and accordingly, a means is needed for diverting such startup material to a waste or recycle stream.

In the past, double-gated diverter designs have been employed, wherein two gates were employed on separate legs of "Y" conduit. Use of these systems of course requires two separate operations. Also, because of the construction of these prior units, the separate diverter gates provided on separate conduits have normally been manipulated manually as opposed to automated means.

SUMMARY OF THE INVENTION

The present invention overcomes the problems outlined above, and provides a diverter apparatus which can be readily controlled from a remote location without the need for manual manipulations of any kind. Broadly speaking, the diverter apparatus of the invention is in the form of an elongated, tubular conduit having at least one opening in the side wall thereof, together with a gate for normally closing the conduit opening(s); gate-shifting means is also provided, preferably in the form of a selectively operable piston and cylinder assembly.

When the diverter apparatus of the invention is interposed within an extrudate conveying system, for example, opening of the gate(s) instantaneously diverts the extrudate and prevents passage thereof past the gate(s).

BRIEF DESCRIPTION OF THE DRAWINGS

FIG. 2 is an enlarged perspective view of the diverter gate apparatus, showing the gate in its normal closed position; and FIG. 3 is a view similar to that of FIG. 2, but depicting the gate in its opened, product-diverting position.

DESCRIPTION OF THE PREFERRED EMBODIMENT

Figure 1:
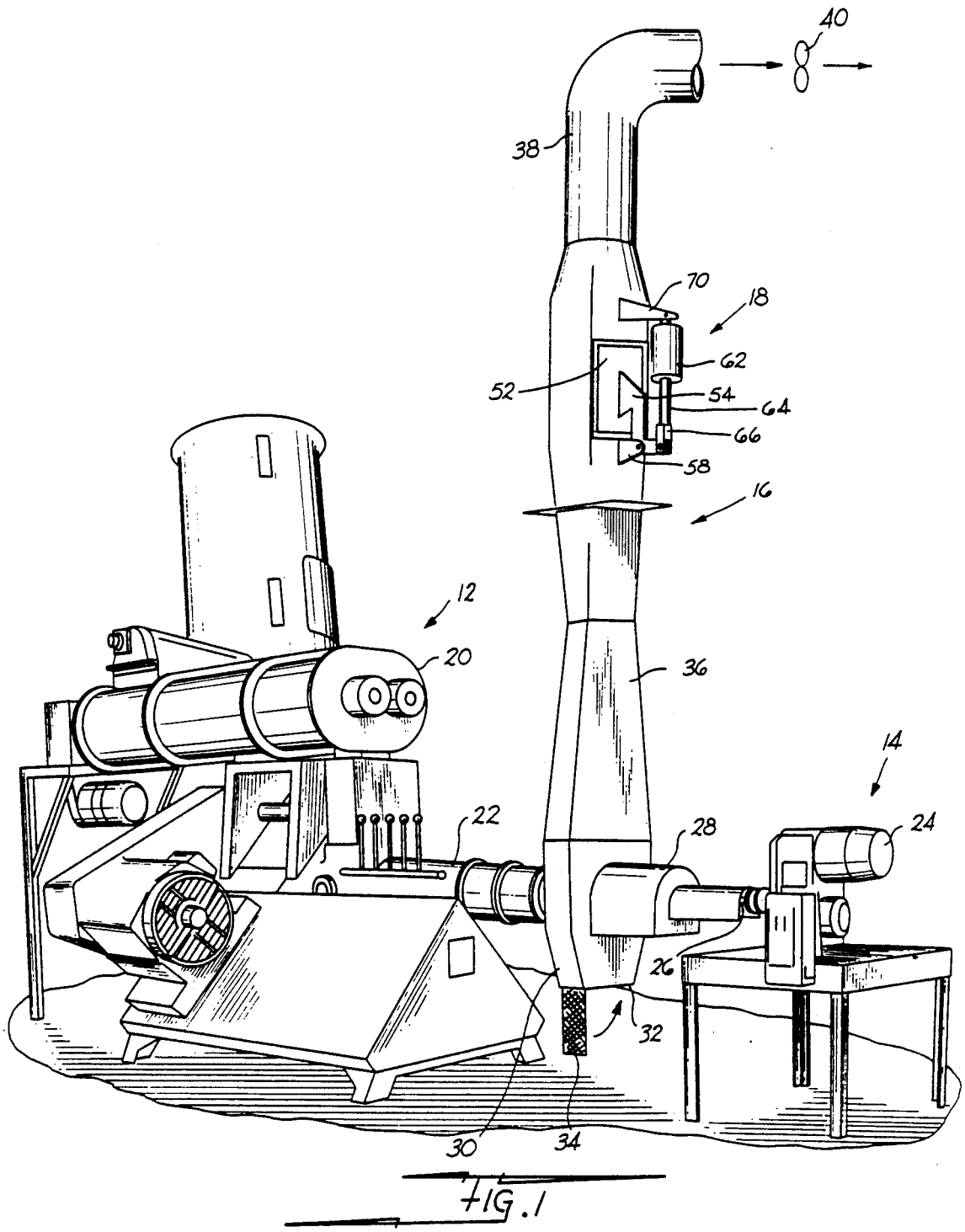
FIG. 1 is a perspective view of an extrusion processing assembly having the diverter apparatus of the invention operably interposed within the pneumatic conveying system thereof.

Turning now to the drawings, an extrusion system 10 is illustrated in FIG. 1. The system 10 includes a conventional cooking extruder 12, rotary knife assembly 14, and pneumatic conveying system broadly referred to by the numeral 16. The latter is equipped with a diverter apparatus 18 in accordance with the invention.

In more detail, the cooking extruder 12 is entirely conventional, with the depicted unit being a Wenger X-175 cooking extruder. This unit includes a preconditioner 20 adapted to premoisten dry ingredients and deliver the same to an elongated, multiple-section extruder barrel 22. The barrel is equipped with an internal, axially rotatable flighted screw (not shown) and an endmost die defining the extruder outlet.

Knife assembly 14 is likewise conventional and includes a drive motor 24 coupled with rotatable shaft 26. The latter is coupled with one or more knife blades within the housing 28, which blades successively cut the extrudate emerging from the extruder die to form discrete product pieces.

The conveying system 16 includes a lowermost tubular section 30 adapted to receive the extruder die and knife structure, so that cut product is introduced into the interior of the section. In addition, it will be observed that the section 30 has an open bottom 32, and is equipped with a perforate screen-type retainer 34. As shown in FIG. 1, the retainer 34 is adapted to cover the open bottom 32 but is weighted to fall under the influence of gravity to an open position for product diversion, as will be described.

The upper end of section 30 is connected to an upstanding tubular section 36, which in turn leads to and is connected with the diverter 18. Downstream of diverter 18 are additional conduit sections, such as section 38, as well as a fan 40. The latter is operatively coupled with the tubular sections so as to draw air currents through bottom 32 and thereby convey cut extrudate along the length of the conveying system 16.

Attention is next directed to FIGS. 2 and 3 which more clearly illustrate the nature of diverter apparatus 18. As illustrated, the apparatus 18 includes an elongated, tubular body 42 presenting an inlet end 44 and an opposed outlet end 46. An opening 48, surrounded by a frame 50, is provided in a side wall of body 42 as depicted. A planar metallic gate 52 is situated adjacent opening 48 and is configured for essentially completely covering this opening. An elongated operating arm 54 is secured to the outer face of gate 52 and has a depending section 56 terminating in an outwardly extending link 57. A bifurcated bracket 58 is affixed to body 42 beneath frame 50, and receives the lower end of section 56. A pivot pin 60 is provided for pivotally securing arm 54 within bracket 58.

A piston and cylinder assembly 62 is also provided for selective opening of gate 52. The assembly 62 is conventional and includes a downwardly extending rod 64 terminating in a yoke 66. The latter is pivoted to the outermost end of link 57 by means of pin 68. Assembly 62 is pivotally supported by means of transverse bifurcated bracket 70 secured to body 42 above frame 50.

As will be readily apparent from a study of FIGS. 2 and 3, gate 52 may be selectively opened by retraction of rod 64, thereby permitting the entrance of substantial quantities of air through opening 48, as indicated by arrow 72. Of course, such selective operation of gate 52 may be readily accomplished from a remote location using conventional control apparatus.

During normal operation of the system 10 illustrated in FIG. 1, extrudate created by extruder 12 and assembly 14 is conveyed upwardly through the system 16 by virtue of the air currents induced by fan 40. In this mode of operation, the retainer 34 would be pulled upwardly against bottom 32. In the event of a system upset or other situation requiring product diversion, it is only necessary to actuate piston and cylinder assembly 62 to open gate 52, whereby excess air will be drawn through opening 48. This in turn will cause retainer 34 to swing downwardly, and the unsatifactory extrudate emerging from the extruder can then fall by gravity through the bottom 32. When the upset has been cured, it is only necessary to again actuate assembly 62 to close gate 52, whereby normal conveying operation will begin anew.

It will also be appreciated that a pair of adjacent openings could be provided in conduit body 42, with an associated gate 52 and operating mechanism for each such opening. In such a case, the gates would normally be designed for simultaneous operation, in that the use of plural openings results from the need for additional airflow for proper product diversion.

We claim:

1. In combination:
   apparatus including a cooking extruder having an outlet for creating product pieces;
   a pneumatic conveying system operably coupled with said cooking extruder for conveying said product pieces, said conveying system comprising an elongated, upright conduit for receiving said pieces and presenting first and second spaced apart open ends, said extruder outlet passing through said conduit between said first and second ends for depositing said product pieces into the conduit between said ends;
   fan means downstream of said extruder outlet for inducing product-conveying air currents within said conduit by passage of air into and through the one of said open ends upstream of said extruder outlet;
   means defining at least one opening in said conduit between said extruder outlet and said fan means;
   substantially planar, plate-like gate means configured for covering said at least one opening and presenting lowermost margins adjoining corresponding lowermost margins of said opening-defining means;
   means pivotally mounting said gate means adjacent said at least one opening for pivoting movement of the gate means about an axis transverse to the longitudinal axis of said conduit and located where said lowermost margins of said gate means and said opening-defining means adjoin; and
   means for selectively pivoting said gate means between a first position covering said opening and a second position within the confines of said conduit, said gate means, in the second position thereof, permitting entrance of air through said opening and along the length of said conduit downstream of the opening while preventing passage of said pieces past the gate means.

2. The combination of claim 1, said gate pivoting means comprising a piston and cylinder assembly situated externally of said conduit and operably coupled with said gate means.

3. The combination of claim 1, said gate means being substantially rectangular.

* * * * *